United States Patent [19]

Behun

[11] Patent Number: 4,620,198

[45] Date of Patent: Oct. 28, 1986

[54] MULTICOLOR INK JET PRINTHEAD

[75] Inventor: Eugene Behun, Rochester, N.Y.

[73] Assignee: Xerox Corporation, Stamford, Conn.

[21] Appl. No.: 799,993

[22] Filed: Nov. 20, 1985

[51] Int. Cl.[4] .......... G01D 15/18

[52] U.S. Cl. .......... 346/75; 346/46

[58] Field of Search .......... 346/46, 75; 358/75

[56] References Cited

U.S. PATENT DOCUMENTS

| | | | |
|---|---|---|---|
| 3,476,874 | 11/1969 | Loughren | 358/75 X |
| 3,987,492 | 10/1976 | Kraus et al. | 346/75 |
| 4,017,869 | 4/1977 | Meyer et al. | 346/75 |
| 4,178,597 | 12/1979 | Isayama et al. | 346/75 |
| 4,320,406 | 3/1982 | Heinzl | 346/140 R |
| 4,382,262 | 5/1983 | Savit | 346/1.1 |
| 4,403,228 | 9/1983 | Miura et al. | 346/75 |

FOREIGN PATENT DOCUMENTS

| | | |
|---|---|---|
| 5267286 | 10/1979 | Japan . |
| 54134226 | 5/1981 | Japan . |

*Primary Examiner*—E. A. Goldberg
*Assistant Examiner*—Gerald E. Preston
*Attorney, Agent, or Firm*—Robert A. Chittum

[57] ABSTRACT

A multicolor ink jet printhead for use in a continuous stream ink jet printing system is disclosed. Each ink emitting nozzle is supplied from a separate ink reservoir under a predetermined pressure to an associated inlet in a common droplet generator. A means of passage is provided from the inlet of the droplet generator to a respective nozzle through a medium in the droplet generator resonance cavity. The passage means maintaining the separation of the various colored inks from the cavity medium, the passage means being relatively impedance matched when the cavity medium is liquid or a solid. Therefore, a single acoustic driver and droplet generator may be used for perturbating the different colored inks emitted from the nozzles thereof. In one embodiment, each of the multicolored streams of ink droplets emitted from the nozzles are fanned in a direction perpendicular to the translation direction of the printhead, so that a swath of information is printed on a stationary but steppable recording medium. A translation of the printhead enables superimposed printing to effect composite colors or halftone shaded patterns. In another embodiment, the recording medium is in the form of cut sheets and mounted on a rotatable drum so that groups of nozzles emitting the same colored ink may be used with the ink droplets fanned in a direction parallel with the printhead translation, resulting in wider bands of information being produced in a "barber pole" fashion on the recording medium.

9 Claims, 8 Drawing Figures

CONTROLLER
INK RESERVOIR
D/A
D/A
D/A
D/A
V

MULTICOLOR INK JET PRINTHEAD

BACKGROUND OF THE INVENTION

1. Field of the Invention

The present invention relates to ink jet printheads and more particularly to multicolor ink jet printheads for use in continuous stream type ink jet printing systems.

2. Description of the Prior Art

Generally, in ink jet devices employing multiple nozzles from which continuous streams of ink droplets are admitted and directed to a recording medium or a collecting gutter, there are one or more rows of nozzles which receive an electrically conductive recording fluid, hereinafter called ink, from a pressurized supply reservoir or manifold. The ink may be, for example, a water-base fluid, and is ejected through the nozzles in rows of parallel streams or filaments. The ink is stimulated prior to or during its exiting from the nozzles so that the stream breaks up into a series of uniform droplets at a fixed distance from the nozzles. As the droplets are formed, they are selectively charged by the application of a charging voltage to charging electrodes positioned adjacent the streams at a location where they break up into droplets. The droplets which are charged, are deflected by an electrical field, either into a gutter for ink collection and reuse, or to a specific location on a recording medium, such as paper, which may be continuously transported at a relatively high speed across the droplets.

Printing information is transferred to the droplets through charging by the charging electrodes. The charging control voltages are applied to the charging electrodes at the same frequency as that which the droplets are generated. This permits each droplet to be individually charged so that it may be positioned at a distinct location different from all other droplets or sent to the gutter. Printing information cannot be transferred to the droplets properly unless each charging electrode is activated in phase with the droplet formation at the associated ink stream. Failure to do this results in partially charged droplets which may miss the gutter or deposit the droplet at an erroneous position on the recording medium.

It is therefore apparent that ink jet droplet printers of the continuous stream type described above cannot be operated at their maximum quality level unless the droplets in all streams are charged in synchronism with their associated generation morphology. This implies either a measurement of droplet generation timing for each and every stream, or control of the droplet generation in such a way that the timing or phase of droplet generation is predetermined. The latter is not practically achieved for high quality printing. Consequently, the correct phase is determined during calibration for each jet utilizing droplet sensors.

A variety of printhead designs have evolved for single color, continuous stream ink jet printing. While color printing with ink jets has been considered a strong point for the technology, design proposals and prior art printheads for the implementation of multicolored, continuous stream type printing have been relatively embryonic up to this point in time. For example, each color has been considered to be applied by a separate drop generator and charge/deflection/guttering structure. Consequently, the design is burdened by tight mechnical alignment tolerances between the printheads for quality printing and duplication of hardware elements, both resulting in expensive manufacturing costs. The present invention is directed towards identifying means whereby a unitized multicolor printhead may be designed to minimize duplication of hardware elements and have the tight mechanical alignment tolerances relegated to an inherently precise manufacturing process.

U.S. Pat. No. 4,320,406 to Heinzl discloses an ink printing device for a piezoelectrically driven multicolored printhead of the drop-on-demand type. The printhead comprises a plurality of ink passageways or channels, each with its own piezoelectric driver. The passageways serve as ink channels and terminate at a discharge end that abuts restricted orifices formed in a plate. Ink droplets are ejected through the orifices in paths perpendicular to the recording medium. Corresponding ink channels extend rearward from the orifice plate in diverging patterns. The rear end of each channel communicates with a corresponding restricted passage formed transversely through a throttle plate. Each ink channel is concentrically surrounded therealong by a separate piezoelectric drive element. Upon application of a voltage to one or more of the drive elements, a channel portion is contracted to generate a pulse which causes ejection of a droplet from the orifice, which is propelled toward the recording medium. Ink is supplied to the ink channels via a one of a plurality of ink manifolds formed in the rear of the printhead body. Each manifold chamber communicates respectively with a particular set of ink channels. In the preferred embodiment, respective ink channel sets are connected through the throttle plate with its associated manifold chamber. The manifold chambers are supplied with ink via corresponding supply lines which are in fluid communication with corresponding individual ink reservoirs, each having a different color of ink.

Japanese patent application No. 54-134226, published without examination on May 22, 1981, as laid open number 56-58876 to Ishihara, discloses an apparent drop-on-demand multicolor recording head comprising a plurality of individual ink jet printheads arranged radially about a point on the recording medium so that the ink jet heads are focused in the same point on the recording medium. The multicolor printhead is arranged on a carriage for reciprocal movement backwards and forwards across the recording medium.

Japanese patent application No. 52-67286, published without examination on Oct. 1, 1979, as laid open number 54-2728 to Yamazaki, discloses a single jet, continuous stream type printing head. The printhead ejects a colorless ink which, after charging at a charging station, passes through an accelerating electrode ring and through selectively actuated mist streams of predetermined density and different colors. The mist streams are actuated in response to the recording color desired by the signal for producing each of a variety of colored droplets. Thus, as the charged droplet passes through the one or more colored mist streams, they pick up the desired color prior to impinging on the recording medium.

U.S. Pat. No. 4,382,262 to Savit, discloses method and apparatus for ink jet printing in a plurality of colors on the substrate whereby the apparent drop-on-demand ink jet printing nozzles direct droplets of a liquid to the substrate containing complementary dye components which produce a finished dye at the points of impact of the liquid onto the recording medium. Different ink jet printing nozzles utilize different complementary dye components on the same substrate producing different dyes and thereby different colors. One of the problems solved by this invention is that of nozzle clogging caused by ink composition having high concentrations of dye which produce ink of inherently high viscosity that tend to clog the jet nozzles. In addition, ink jet printing compositions frequently contain dissolved resinous materials to improve adhesion of droplets to a substrate. Dissolved resins exacerbate the viscosity problems and form plugs in the nozzle when the composition dries therein.

U.S. Pat. No. 4,403,228 to Miura et al, discloses a multi-nozzle ink jet printing head. A common air flow chamber is connected with the nozzle to discharge air and ink therethrough to a writing surface. This patent relates to a printhead having a plurality of nozzles in which the combined effects of air pressure gradient and electrical potential gradient are utilized to discharge a controlled number of jet streams of ink droplets. For proper operation of prior art printheads, the liquid nozzle had to be aligned with one to one correspondence with the air-liquid nozzles with a high degree of precision. Because of close tolerances, this alignment is extremely difficult to achieve. One of the stated objects of this patent is to provide a multi-nozzle ink jet printing head of the air and liquid type which can be fabricated without the close tolerances.

U.S. Pat. No. 4,178,597 to Isayama et al, discloses a color ink jet printing apparatus in which an ink ejection head comprises three ejectors for ejecting inks of three primary colors. Each ejector ejects ink of a respective color in response to one of three respective electrical signals. The printhead or ejection head in this patent comprises three ink ejectors for the respective colors which ejects colored ink in superposition on the sheet in response to the three respective electrical color signals. The problem that this patent solves is that erroneous colors are produced at the boundaries of two colors on the sheet where one of the ejectors is shut off and the other ejector is turned on. This problem is solved by circuit means delaying ink ejection from the ink ejector corresponding to the signal which has been initiated. This creates an area at the boundary void of both colors, thus avoiding the production of an erroneous color.

In considering the design of a carriage type ink jet printer capable of more than one color printing, the straight forward approach is complete duplication of all of the printhead functions, that is, the placement of multiple printheads on the carriage equal in number to the number of colors to be printed. A four-color printer, for example, with a single jet for each four colors, magenta, cyan, yellow, and black, would require complete separate systems if designed in accordance with the prior art continuous stream type printheads. Even if the deflection plates and charge tunnels were fabricated as a unit for all four of the jets, each jet would still require an individual nozzle structure and driver with attendant cost and parts as well as alignment.

SUMMARY OF THE INVENTION

The present invention overcomes the above-described difficulties and disadvantages associated with prior art devices by providing a common droplet generator for perturbating four or more different colored ink supplies connected to the printhead nozzles.

A multicolor ink jet printhead for use in a continuous stream ink jet printing system is disclosed. Each ink emitting nozzle is supplied from a separate ink reservoir under a predetermined pressure to an associated inlet in a common droplet generator. A means of passage is provided from the inlet of the droplet generator to a respective nozzle through a medium in the droplet generator resonance cavity. The passage means maintaining the separation of the various colored inks from the cavity medium, the passage means being relatively impedance balanced when the cavity medium is liquid as opposed to a solid. Therefore, a single acoustic driver and droplet generator may be used for perturbating the different colored inks emitted from the nozzles thereof. In one embodiment, each of the multicolored streams of ink droplets emitted from the nozzles are fanned in a direction perpendicular to the translation direction of the printhead, so that a swath of information is printed on a stationary but steppable recording medium. A translation of the printhead enables superimposed printing to effect composite colors or halftone shaded patterns. In another embodiment, the recording medium is in the form of cut sheets and mounted on a rotatable drum so that groups of nozzles emitting the same colored ink may be used with the ink droplets fanned in a direction parallel with the printhead translation, resulting in wider bars or stripes of information being produced in a "barber pole" fashion on the recording medium.

The invention will be understood by a reading of the detailed disclosure, making reference to the figures delinated below. The various figures are not drawn to scale, and certain features such as, for example, the ink channels and coatings, are greatly exaggerated in size for purposes of explanation. In each of the figures, identical parts have been given the same index numerals for ease of understanding.

DESCRIPTION OF THE PREFERRED EMBODIMENT

Figure 1:
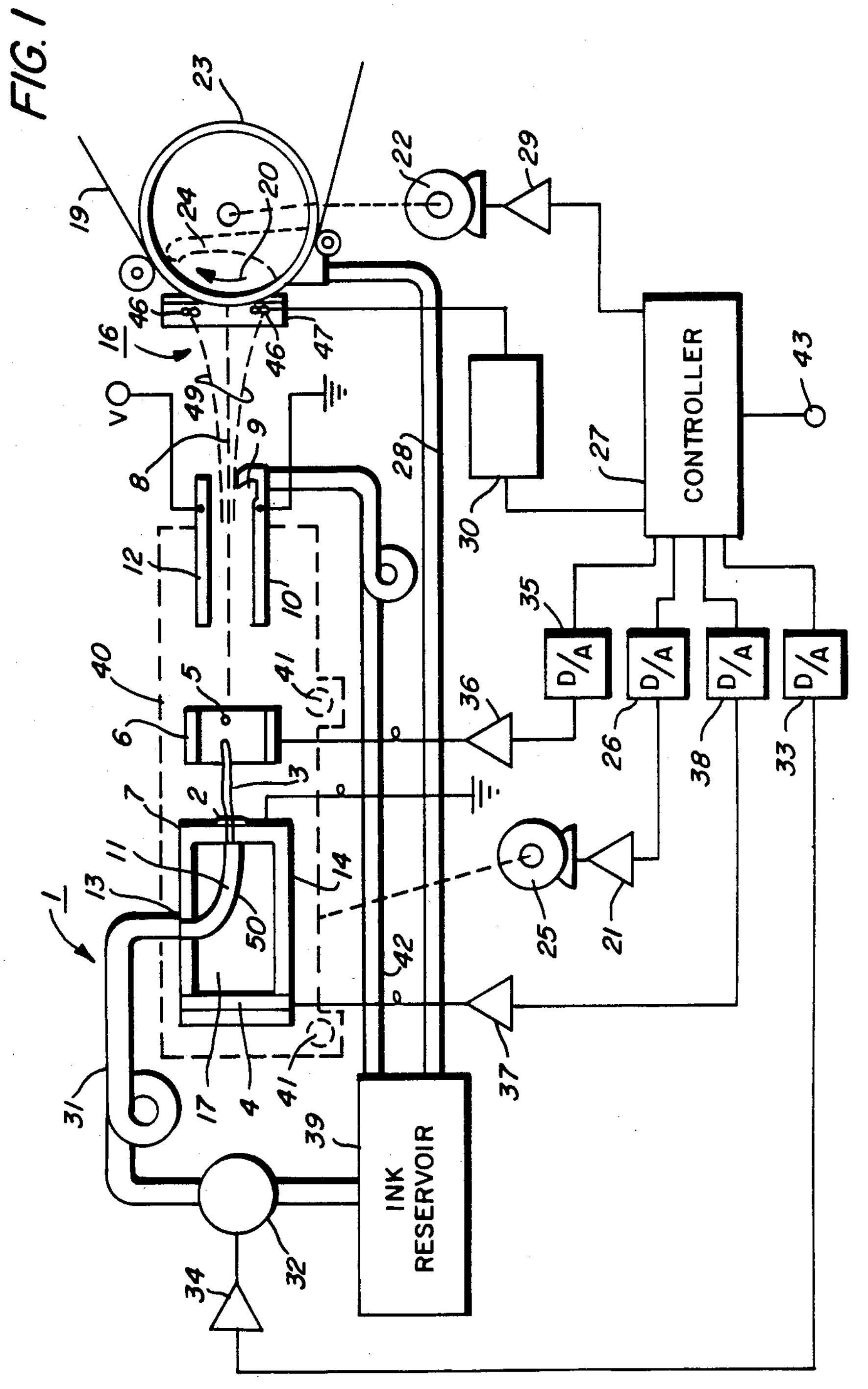
FIG. 1 is a side elevation view in schematic form of a multicolor, continuous stream type ink jet printer having the reciprocating droplet generator of the present invention.

The pictorial, multicolor, continuous stream type ink jet printer of FIG. 1 includes a reciprocating printhead 1 shown in dashed lines which comprise a droplet generator 14 of the present invention, charging electrodes 6, and deflection plates 10 and 12. The droplet generator 14 has a grounded ink manifold 7 with one nozzle 2 for each color of ink 11 to be emitted under pressure creating a continuous stream 3 of ink from the nozzles. In the preferred embodiment, four different colored inks are used as more fully discussed later. Although the printhead 1 shown in FIG. 1 has at least four nozzles, four charging electrodes, and four gutters with a different colored ink being provided to the nozzles through a fluid 17 in manifold 7, only one ink stream charging electrode and gutter is shown in the side view and described accordingly. A piezoelectric device 4 coupled to a wall of manifold 7, periodically stimulates the fluid in the manifold with a pressure wave which promotes the formation of droplets 5 adjacent a charging electrode 6 more fully described later. The ink is conductive, so that voltage applied to the charging electrode at the moment of droplet formation results in a droplet 5 having a charge proportional to the applied voltage.

The charged droplets are deflected by deflection plates 10 and 12 in the plane of FIG. 1, or in the direction of periodic stepped movement of a recording medium 19 as depicted by arrow 20. The flat deflection plates 10, 12 have a high electrostatic field between them established by a voltage applied to plate 12, while plate 10 is grounded. However, the deflection plates may be the W-shaped configuration to compensate for carriage motion, the angle being determined by the degree of interlace and the number of droplets in the channel. Typically, the charging voltages applied to each charging electrode 6 are in the range of $-100$ to $+150$ volts, while the potential difference between the deflection plates 10, 12, is in the vicinity of 2,000 to 3,000 volts. The droplets not directed to the recording medium are directed to a gutter 9 in deflection plate 10. Individual gutters are provided for each of the colored inks and are conveniently located below the individual streams of colored ink droplets. The gutter directed droplets may be charged or uncharged as a design choice, but in the preferred embodiment of FIG. 1, the uncharged droplets follow the straight line trajectory 8 to the recording medium. Relatively inexpensive precision alignment between the charge tunnel, deflection plates, and gutters are possible through design by means well known in the art, minimizing the assembly interfaces and integral manufacturing technique. Each ink stream 3, however, requires an individual nozzle, pressurized ink supply, and means of stimulation. In the prior art, each different colored ink requires its own self contained system with attendant cost and parts as well as close tolerance alignment. As discussed more fully later, the present invention uses a sealed plastic tube from each printhead inlet 13 through a liquid medium 17 to a respective nozzle 2, so that only one driver 4 is necessary for all four colored ink supplies traveling through the printhead manifold 7.

A height control sensor 16 is located adjacent one end of an elongated platen 23 which is similar to the height control sensor described in U.S. application Ser. No. 692,260, filed Jan. 17, 1985 now U.S. Pat. No. 4,577,197, to Crean et al and assigned to the same assignee as the present invention. The height control sensor operates in a servo-loop with the charge amplifiers to adjust the deflection of droplets 5 which are swept or fanned in a vertical direction or columnar manner. The droplet vertical deflection process is substantially linear and the droplets are substantially evenly spaced so that the droplets can be positioned accurately within its vertical range to all droplet targets or pixels on the recording medium. The printhead 1 has a droplet generator 14 with four nozzles and is mounted on a movable carriage 40 and adapted for reciprocable movement by means well known in the art such as slide rails 41. Reciprocating traversal of platen 23 by the printhead is accomplished by driven means 25 in response to signals from the controller 27 through digital to analog (D/A) controller 26 and amplifier 21. The direction of reciprocation is parallel to the platen and the portion of the recording medium thereon which is to receive the ink droplets. The droplet generator is generally positioned on one end of the platen when not printing, and traverses back and forth adjacent the recording medium on the platen printing in only one direction during the printing mode. At the end of some or each traversal, the droplet generator proceeds a relatively short distance beyond the end of the platen to the height sensor 16 where one or more columnar sweeps of test droplets are sensed from each nozzle.

During the traversal across the recording medium, the plurality of streams of droplets of different colored inks are continually swept in a direction perpendicular to the traversal direction for a predetermined height so that a swath or stripe of information may be printed one swath at a time until a full page of information is recorded. At the end of each printed swath and/or during the sensing of a test sweep of droplets, the platen is stepped in a direction perpendicular to the droplet generator reciprocating direction for a distance of one swath height.

The ink jet printer is designed to record information on an incrementally movable recording medium which is held stationary during the printing of a swath of information, then stepped the distance of one swath prior to the printing of the next swath of information.

Except when the printhead is not printing, or is having its calibration checked, the ink droplets are directed to the recording medium or to the gutter 9, depending whether, during the traversal of the droplet generator, the droplets are required for printing at specific pixel locations or not on the recording medium. Thus, the system of FIG. 1 makes multicolored marks on the recording medium, for example, white paper, in response to electrical information signals. The information or video signals are applied to the controller 27 which is a processor such as, for example, the model 68000 sold by the Motorola Corporation.

The controller also includes output that issue electrical control signals to the various system components. Amplifier 29 couples the controller to the medium stepper motor 22. Under the direction of the controller, the recording medium is stepped an incremental distance at the end of each traversal by the printing head. The controller 27 also includes an output to drive the piezoelectric device 4 that promotes the droplet formation. The piezoelectric device is driven at a frequency that gives rise to droplet generation rates typically in the vicinity of 100 to 200 kHz. The amplifier 37 and D/A converter 38 couple the piezoelectric device and the controller together.

A flexible conduit 42 for each color of ink to be printed connects to its associated gutter 9 and to its respective ink reservoir 39 to permit the unused ink to be recycled to its respective ink reservoir. Another set of conduits 28 connects the set of gutters 24 which are used for the collection of the sweeps of test ink droplets to the respective ink reservoirs for recycling the ink received by this set of gutters. The trajectories of the upper and lowermost droplets in the columnar sweep of pixels from each nozzle are diagrammatically depicted by dashed lines 49 to show the vertical deflection of the droplets as they are directed to either the recording medium or to the set of gutters 24, when the printhead is in the test position. The droplets not targeted for the recording medium during the printing of the swath of information are, of course, directed to gutter 9.

The controller 27, in response to receipt of digitized data signals at its input terminal 43, applies the charging voltage to the charging electrode 6 via D/A converter 35 and amplifier 36 by means well known in the art to convert video or digitized data signals to droplet charge signals and to compensate concurrently the charged signals for aerodynamic and electrostatic effects. Refer to, for example, U.S. Pat. No. 3,828,354, to Hilton.

The height control sensor 16 is optionally placed at one end or the other of platen 23 and positioned to receive a columnar sweep of test droplets from the printhead. The height control sensor is aligned with the swath of information printed or to be printed on the recording medium so that the only movement necessary by the printhead to position itself for emitting the sweep of test droplets is a periodic extension of its normal printing movement, a short distance to align each of the nozzles with the height control sensor. The height control sensor may sense the droplet trajectories from each nozzle one at a time, but in the preferred embodiment has the capability of sensing the droplet trajectories from all of the nozzles concurrently.

For each stream of droplets, the height control sensor has an upper and lower pair of droplet sensors 46 similar to those described in U.S. Pat. No. 4,255,754 to Crean et al. The upper and lower sensor pair are placed in the printing plane of that portion of the recording medium 19 targeted to receive a single swath of superposed color printing. The upper and lower sensor pairs are mounted on a mounting structure 47 which is fixedly attached to the stationary printer base (not shown). The mounting structure has a plurality of elongated openings oriented to have a vertical or columnar sweep of test droplets pass through each opening from an associated nozzle. The gutter 24 is fixedly positioned downstream from the height control sensor to receive separately the sensed test droplets from each of the plurality of different colored ink emitting nozzles for collection and return to the respective ink reservoir containing the appropriate colored ink by conduits 28.

In one representative calibration mode, a sequence or sweep of test droplets from each nozzle may be thrown past the respective upper and lower sensor pairs of the height control sensor 16, and the location of the droplets that pass the centerline between each pair of sensors are identified by circuitry 30 and recorded in a memory unit of controller 27 as the upper and lower droplets in the printing swath of information. In this manner, the closest droplet trajectory to the desired trajectory is identified and via the sensor circuitry 30 and controller 27, the voltage of the droplet following that trajectory is identified. As is well known in the prior art, the sequence and voltage at time of droplet charging are some of the droplet characteristics of each test droplet that are temporarily stored in a log table in the memory unit of the controller. The upper and lower test droplets and their interspatial distance can be readily determined by the controller by means well known in the art. Therefore, the droplets having the closest trajectors to the desired ones are identified and its log table status used to extrapolate the parameters of the droplet to achieve the desired trajectory. Thus, the controller maintains the correct interdroplet spacing per swath height by adjusting the charging voltage.

The present invention is only concerned with the droplet generator portion of the reciprocating printhead and therefore further details of the printing apparatus will not be discussed. The prior art approach for multicolor ink jet printing systems is that of complete duplication of all the printhead functions, that is, the placement of multiple printheads on the carriage equal in number to the number of colors to be printed. Therefore, a typical prior art four color ink jet printer would have a single jet for each color with its own deflection plates and charge tunnels, all assembled as a unit, before all four of the jets. Although relatively inexpensive alignment between the charging electrodes, deflection plates, and gutters are possible through integral manufacturing techniques, each prior art jet requires an individual nozzle structure and individual driver with attendant cost in both components as well as jet-to-jet alignment. This invention overcomes the requirement for separate droplet generators with separate associated piezoelectric drivers.

Figure 2A:
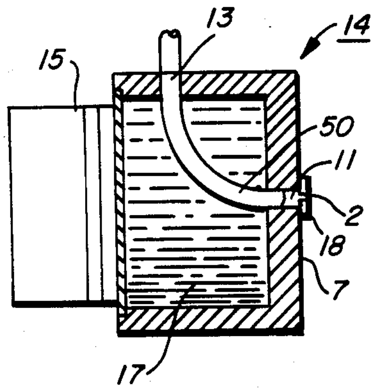
FIG. 2A is a side view of the droplet generator of FIG. 1.
Figure 2B:
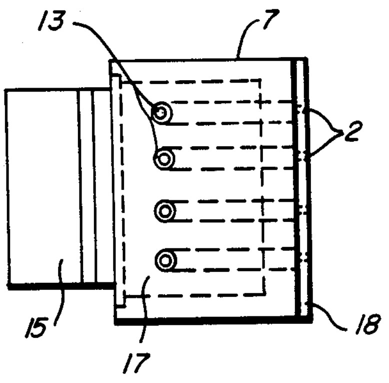
FIG. 2B is a top view of the droplet generator of FIG. 1.

FIGS. 2A and 2B illustrate a four color, four jet, droplet generator. In accordance with the present invention whereby each of the four nozzles 2 in nozzle plate 18 is supplied with a different colored ink from individual tubes 50 leading through the droplet generator manifold 7, the fluid in the manifold cavity or resonant chamber external to the individual tubes may simply be water to transmit the acoustic energy, as in the prior art, from the driver to the individual ink jets. The tubing 50 may, for example, be fabricated from any material, such as plastic, having an acoustic impedance reasonably matched to the ink formulations and low internal dampening at the frequency of interest. Various commercial formulations of polyethylene and polypropylene having acoustic impedances between $2\text{-}3\times10^6$ kg/m-sec. and attenuation between 5 and 10 db/cm at a frequency of 1 mHz are suitable for use. While the attenuation levels are several orders of magnitude greater than the level for the ink, a relatively small amount in the cavity should not pose a significant problem. Thus, the multicolored droplet generator in the preferred embodiment has one acoustic driver 15 for perturbating the manifold cavity liquid 17, while four different colored inks pass through separate tubes for jetting ink from nozzles 2 at a predetermined pressure. Impedance matching of the tube material containing each of the four colors of ink enables the perturbated liquid and the manifold chamber to perturbate the ink in the tubes, thus causing the ink streams to break into droplets at predetermined distances from the nozzles. Each nozzle has an individual ink supply from an ink reservoir 39 and the pressure of the ink in the drop generator tubes is maintained by servo controlled pump 32. The flexible conduit 31 between the pumps 32 and the inlet ports 13 may be connected at each by any standard conduit to tubing coupling is well known in the art.

Figure 3:
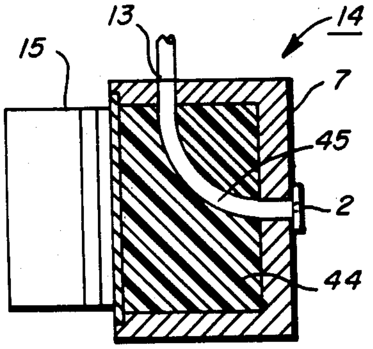
FIG. 3 is a side view of the droplet generator of an alternate embodiment.

FIG. 3 illustrates an alternate embodiment of the present invention, wherein the same basic droplet generator of FIGS. 2A and 2B are used, except that the fluid cavity surrounding the plastic tubes carrying the ink between the droplet generator inlets and the nozzles is replaced by solid material, such as plastic. The need for individual plastic tubes is obviated and the passageways 45 are molded into the solid plastic in the manifold cavity to serve as ink channels between the inlet 13 and the nozzles. The higher attenuation of the plastic 44 as compared to the former liquid filled cavity poses a heavier burden on the power required of the acoustic driver 15.

Figure 4:
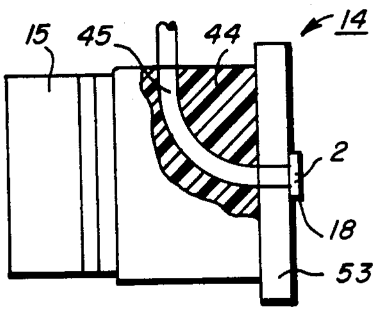
FIG. 4 is a side view of the droplet generator showing another embodiment thereof.

In FIG. 4, an alternate embodiment of that shown in FIG. 3 is illustrated whereby the drop generator body comprises the molded plastic 44 with molded channels or passageways 45 terminating at nozzles 2 in nozzle plate 18 that is attached to a structural stiffener 53, fabricated out of a material such as steel. The metal structure of the manifold in FIGS. 2A, 2B, and FIG. 3, serves no acoustic purpose in this embodiment. The impedance mismatch between the molded plastic body 44 and the surrounding air is still extremely high so as not to be source of energy loss through radiation to the air. The structural stiffener 53 is attached to the molded plastic body 44 to facilitate the attachment of the orifice plate 18 having the nozzles 2 and to facilitate mounting of the entire droplet generator 14 to the translating carriage 40.

For a higher throughput, a multiplicity of streams of droplets for each color may be used in a well known rotary drum configuration (not shown). In this configuration, the copy paper is the cut sheet type and is wrapped around a drum with the streams of droplets directed thereto from a translating carriage. The drum holding the paper is rotated as the printhead reciprocates back and forth along the axis of the drum. The droplets from each stream are deflected within their predetermined segmental widths along a line coincident with line on the surface of the paper as the drum rotates and the printhead traverses the drum, so that the typical "barber pole" printed ribbon is fashioned inclined to the drum axis.

Figure 5A:
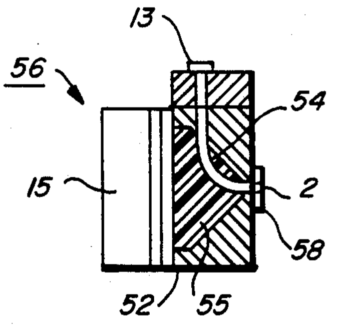
FIG. 5A is a side view of an alternate embodiment of the droplet generator of FIG. 1.
Figure 5B:
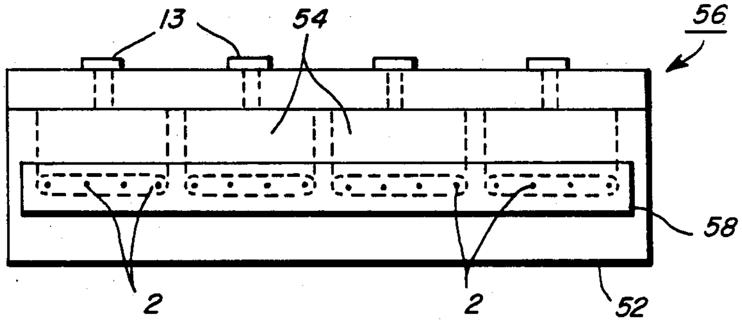
FIG. 5B is a front view of the droplet generator of FIG. 5A.

A four color droplet generator 56 is shown in FIGS. 5A and 5B depicting a further embodiment of the present invention in which each ink color is provided through groups of four nozzles each, each colored ink have their respective four nozzles grouped together (see FIG. 5B), their ink supply being located in manifolds 54, one for each color, molded into the plastic filled acoustic cavity 55. A single ink line (not shown) for each of the colored inks enters the top of the drop generator structure 52 at inlet 13 to supply the individual manifolds 54. Another embodiment (not shown) would be the plastic molded version for this configuration similar to the one shown in FIG. 4. Still another embodiment (not shown) would be the liquid filled cavity type of FIGS. 2A and 2B where each nozzle is supplied ink through an individual tube that passes through the liquid in the cavity.

Figure 6:
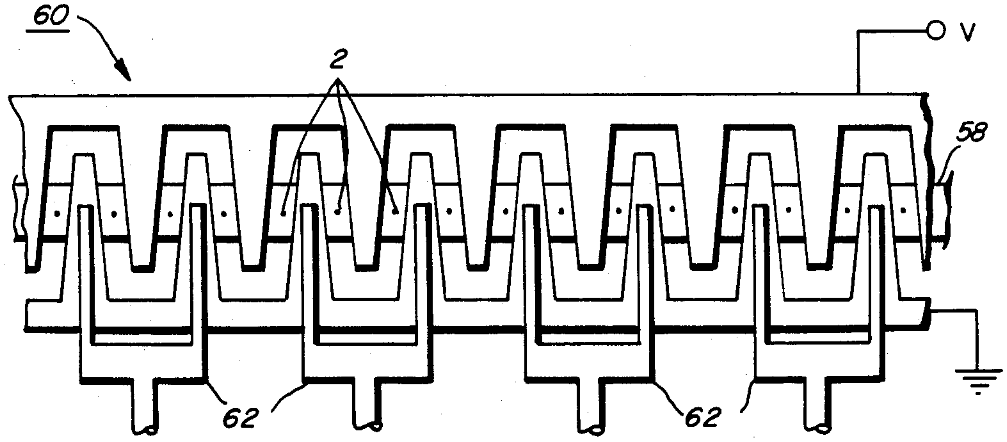
FIG. 6 is a front view of the deflection plates and gutter arrangement used by the droplet generator of FIGS. 5A and 5B, looking upstream.

FIG. 6 is a front view of the printhead looking from a position upstream thereof and toward the nozzles with the charging electrodes removed to illustrate the relationship of the deflection plates and guttering configuration with the nozzle groupings for the embodiment of FIGS. 5A and 5B. The deflection plates 60 are the conventional W-shaped plate configuration with two gutters 62 serving each group of four jets of one color which drain together in a common drain manifold 64 for return of each color of ink to the individual pumps and reservoirs.

Although the foregoing illustrates the preferred embodiment of the present invention, other variations are possible. All such variations as would be obvious to one skilled in this art, are intended to be included within the scope of the invention as defined by the following claims.

I claim:

1. An improved multicolor ink jet printhead for use in a continuous stream ink jet printer of the type having a reciprocating printhead mounted on a movable carriage, the printhead having a droplet generator with at least one nozzle for each color of ink to be printed for respectively producing a single, perturbed continuous stream of ink under pressure that breaks up into droplets at a predetermined distance from the nozzle whereat the droplets are charged in accordance with digitized data signals from a controller for printing swaths of information on a recording medium by sweeping a predetermined series of droplets in one direction while the droplet generator is reciprocated in another direction and repeating the carriage reciprocation and droplet sweeping until a completed page of information is printed in color one swath at a time, the recording medium being incrementally moved a distance equal to the height of one printed swath by a platen after each swath is printed, wherein the improved ink jet printhead comprises:

a droplet generator body having an internal cavity therein filled with a predetermined medium, the droplets generator body having a plurality of inlet ports and an outlet port for each inlet port, each inlet port connecting the cavity to a separate, different colored ink supplied thereto from an ink supply under a predetermined pressure;

a nozzle plate being sealingly positioned over the outlet ports and having one nozzle for each outlet port therein, each nozzle being in communication with the droplet generator body cavity through its outlet port;

an acoustic driver being mounted on the droplet generator body for perturbating the medium filling the cavity of the droplet generator body; and means for sealingly interconnecting each inlet port with a one of the outlet ports, said interconnecting means providing individual passageways of each colored ink entering its respective inlet port and traveling through the medium contained in the droplet generator body cavity to its respective outlet port and separating the ink from the cavity medium as it travels therethrough to its respective nozzle and exits therefrom in a stream of ink, so that only one droplet generator body and only one acoustic driver are required to perturbate simultaneously several different colored ink streams emitted from the printhead.

2. The improved printhead of claim 1, wherein the cavity medium is a liquid, and wherein the interconnecting means is tubing, the tubing comprising a material with an acoustic impedance suitably matched to the liquid in said cavity.

3. The improved printhead of claim 2, wherein the liquid is water and the tubing material is plastic having acoustic impedances between $2\times10^6$ and $3\times10^6$ kg/m-sec with an attenuation between 5 and 10 db/cm at a frequency of 1 mHz.

4. The improved printhead of claim 1, wherein the cavity medium is a plastic and wherein the interconnecting means is individually molded passageways in the plastic medium.

5. The improved printhead of claim 1, wherein the droplet generator body is a solid plastic material without an internal cavity, and wherein the interconnecting means comprises individual open channels through the solid plastic droplet generator body, one end of each channel representing the inlet ports and the other end representing the outlet port.

6. A multicolor printhead having a plurality of ink emitting nozzles for a continuous stream ink jet printer of the type having its printhead, charging electrodes, deflection plates, and gutters mounted on a carriage which is adapted to reciprocate in a direction parallel to the axis of a cylindrical, rotatable platen having mounted thereon cut sheets of recording medium, the ink streams emitted from the printhead being in a direction toward the recording medium and being perturbed to cause each ink stream to break up into droplets at a predetermined distance from the printhead nozzles whereat the droplets are selectively charged in accordance with digitized data signals by the charging electrodes prior to the droplets entry into an electrostatic field generated by the deflecting plates as they travel along a flight path toward the recording medium or the gutters, the multicolor printhead comprising:

an elongated droplet generator body having a linear array of nozzles and an internal cavity filled with a predetermined medium, the droplet generator body having at least one inlet port for each colored ink to be printed, each inlet port connecting the cavity to a different colored ink supplied thereto from an ink supply under a predetermined pressure;

a nozzle plate containing the nozzles, said nozzles being in communication with the medium filled cavity;

an acoustic driver being mounted on the droplet generator body for perturbating the medium in the cavity; and means for sealingly interconnecting each inlet port with a group of adjacent nozzles, said interconnecting means directing the ink from the inlet port to its respective group of nozzles through the medium in the cavity and concurrently preventing the various colored inks from contacting the cavity medium as the inks travel therethrough, so that only one droplet generator body and only one acoustic driver are required to perturbate simultaneously several different colored inks emitted from equal groups of adjacent nozzles of the printhead.

7. The printhead of claim 6, wherein the cavity medium is a liquid, and wherein the interconnecting means is tubing fabricated from a material that is substantially acoustically impedance matched with the liquid in said cavity.

8. The printhead of claim 6, wherein the cavity medium is a plastic and wherein the interconnecting means is a plurality of chambers molded in the plastic, one chamber for each color of ink to be printed, each chamber supplying ink to its respective groups of adjacent nozzles and in turn being supplied by at least one opening connecting the inlet ports of the droplet generator body with an associated chamber in the plastic.

9. The printhead of claim 8, wherein the printhead deflection plates are W-shaped, interleaved plates, the upper plate being connected to a voltage and the lower plate being grounded; and wherein the printhead further comprises: a plurality of ink collecting gutters located upstream and separate from the lower W-shaped deflection plate, the gutters collecting the same colored ink being manifolded together with one common conduit for the return of the guttered ink to its ink supply.

* * * * *